Figure 1:
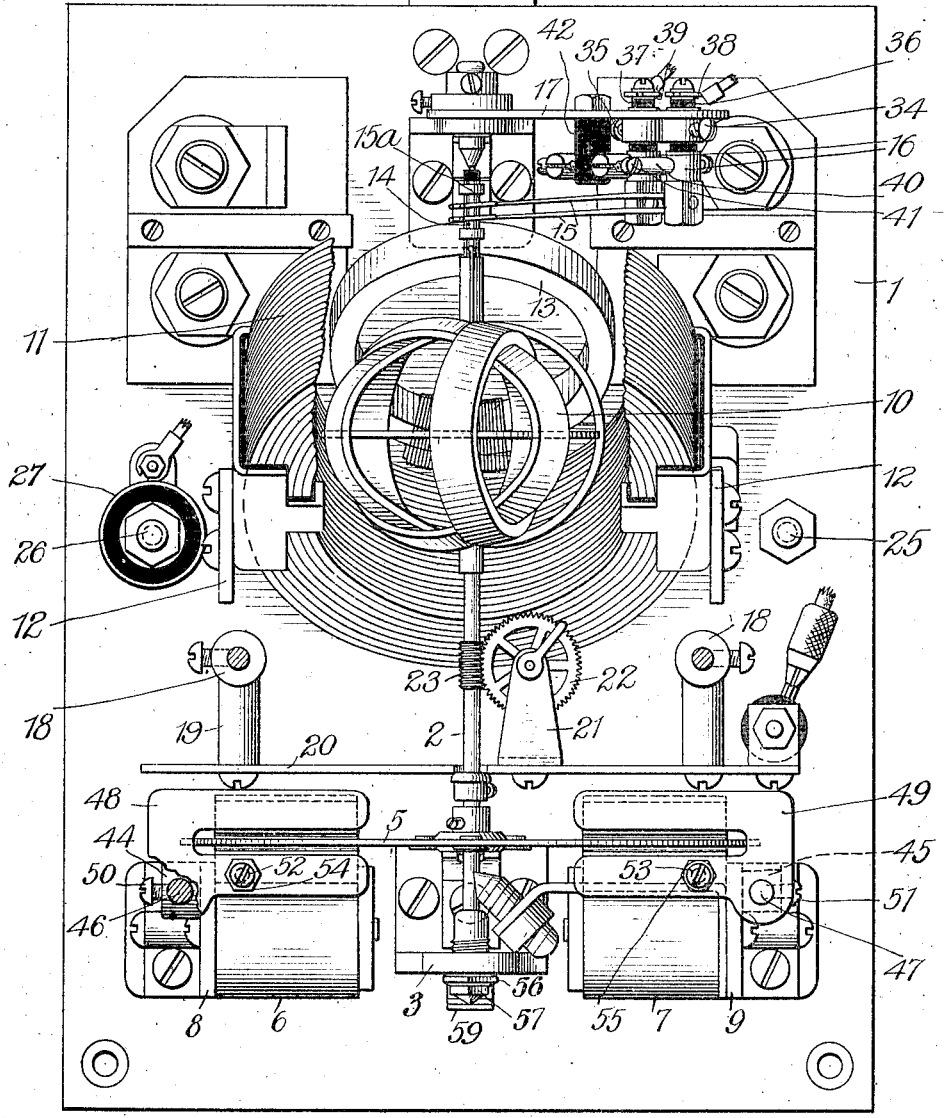

G. A. SCHEEFFER.
ELECTRIC METER.
APPLICATION FILED JAN. 14, 1910.

1,032,778.

Patented July 16, 1912.

2 SHEETS—SHEET 1.

Witnesses:—
Leonard W. Novander.
George E. Higham.

Inventor:—
Gustave A. Scheeffer
by Brown & Williams
Attys

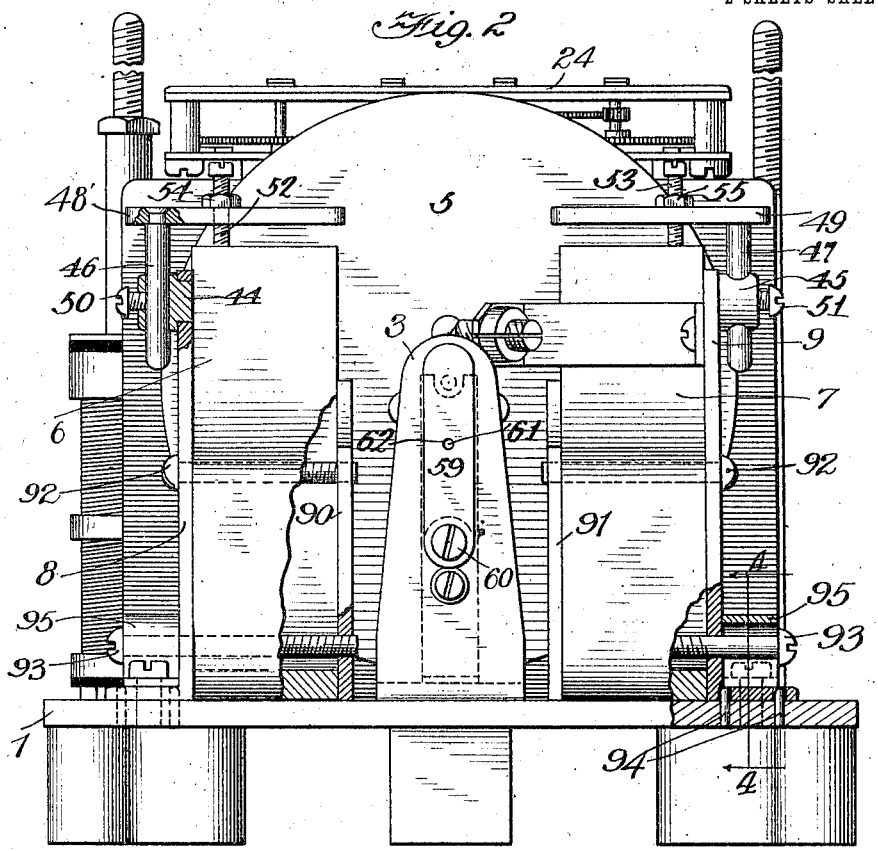

UNITED STATES PATENT OFFICE.

GUSTAVE A. SCHEEFFER, OF INDIANAPOLIS, INDIANA, ASSIGNOR TO COLUMBIA METER COMPANY, OF INDIANAPOLIS, INDIANA, A CORPORATION OF INDIANA.

ELECTRIC METER.

1,032,778.   Specification of Letters Patent.   Patented July 16, 1912.

Application filed January 14, 1910. Serial No. 538,032.

*To all whom it may concern:*

Be it known that I, GUSTAVE A. SCHEEFFER, a citizen of the United States, residing at Indianapolis, in the county of Marion and State of Indiana, have invented a certain new and useful Improvement in Electric Meters, of which the following is a full, clear, concise, and exact description, reference being had to the accompanying drawings, forming a part of this specification.

My invention relates to an improved form of electricity meters adapted to measure a quantity of electricity flowing through any given circuit.

My improved meter construction provides for accuracy of operation, ease of inspection and repair and durability of working parts.

My invention relates particularly to an improved form of magnet shunt associated with the retarding magnets used in connection with the rotatable armature of a meter of the class referred to. These shunt members, one of which is associated with each of the retarding magnets are adjustably mounted from the brackets supporting the permanent magnets so that they may be moved toward or away from the poles as desired and clamped in any position to which they are moved. The supporting members for the shunts also permit angular motion of the same, as a result of which they may be properly adjusted angularly relatively to the retarding disk carried by the armature shaft and coöperating with the permanent magnets. Stops are provided in connection with the magnet shunts in order that any particular adjustment once given them may be again secured without effort, if for any reason it is necessary to remove them from their supporting brackets as, for example to remove the armature from the meter and to again replace such shunts after the armature is put back in operating position.

The several drawings illustrating my invention are as follows:

Figure 1 is a plan view of the meter mechanism complete with the casing thereof removed, and in this figure a portion of the field coil is broken away to show more clearly the armature windings and the starting coil. Fig. 2 is a view from the lower ends of the parts shown in Fig. 1, portions of these parts being broken away to more clearly show the construction of the apparatus.

Similar numerals refer to similar parts throughout the several views.

As shown in the drawings, the base 1 supports an armature shaft 2 by means of a lower bearing 3 and an upper bearing 4. The shaft 2 carries near its lower end a disk 5 of nonmagnetic material disposed between the poles of permanent magnets 6 and 7 held in proper position by the brackets 8 and 9 secured to the base plate 1. The brackets 8 and 9 are bent at their lower ends so that the outstanding portions constitute bearings upon the plate 1 for such brackets. In the angles thus formed reinforcing members 95 are placed, such members preferably consisting of strips of metal bent so as to be engaged by the screws extending through the feet of the brackets into the plate 1, and also by the screws 93 extending through the brackets 8 and 9 and the magnets supported thereby into the clamping plates 90 and 91. Screws 92 are also employed to clamp the magnets 6 and 7 between the brackets 8 and 9 and the plates 90 and 91. Dowel pins 94 are secured in the base plate 1 to hold the brackets 8 and 9 in proper position thereon. The shaft 2 has mounted thereon three armature coils 10 disposed in operative relation to a field coil 11 supported by brackets 12 from the base plate 1. A starting coil 13 is also supported from the base plate 1 in suitable manner so as to occupy a position practically parallel with the field coil 11, the function of this starting coil being to exert a rotative tendency upon the armature windings to compensate for the friction of the moving parts. A commutator 14 is carried by the upper end of the armature shaft 2 and is connected with the windings 10. Brushes 15 are supported by brush holders 16 from the rocker arm 17 having silver plated bearing portions 15ᵉ in such a manner as to rest upon the commutator 14. The rocker arm 17 is supported from the upper bearing 4 of the shaft 2. The rocker arm 17 is rotatably supported by the upper bearing support and is adapted to be held in the normal position by means of the clamping screw 33. The rocker arm 17 has secured thereon by means of the clamping screws 34 and 35 insulating bushings 36 and 37, through which studs 38 and 39 extend beyond the lower side of the rocker arm and the lower ends of these studs extending beyond the insulating bushings 36 and 37 receive the brushholders 16, which serve to support the brushes 15 on the opposite sides of the commutator 14 of the armature, the brushholders 16 having arms 40 extending therefrom toward the commutator 14 and through their ends adjusting screws 41 extend in such a manner as to rest against the insulating stud 42 supported by the rocker arm 17, which stud 42 thus lies between said screws. The brushholders 16 are held in any desired angular position by means of the clamping screws 43.

Main supporting posts 18 extend outwardly from and are rigidly secured to the base plate 1 and by means of arms 19 support a magnetic shield 20 between the permanent magnets 6 and 7 and the field coil and armature windings. The plate 20 has secured thereto a bracket 21 which forms the bearings for the worm wheel 22 engaging the worm 23 on the shaft 2. The posts 18 also serve to support the integrating mechanism 24 shown in Fig. 2.

Posts 25 and 26 extending outwardly from and rigidly secured to the base plate 1, are provided to secure the cover in place to protect the operating mechanism of the meter. A resistance coil 27 is disposed upon the post 26 as indicated, such resistance coil being connected in series with the armature as is the usual practice.

The brackets 8 and 9 have secured to their upper ends the studs 44 and 45 adapted to receive the round rods 46 and 47 which have secured to their upper ends the magnet shunts 48 and 49, clamping screws 50 and 51 being provided to engage the rods 46 and 47 in any desired position. The magnet shunts 48 and 49 are made preferably of soft iron and are U-shaped in order to extend on both sides of the disk 5 in a position to lie adjacent to the poles of the magnets 6 and 7, as a result of which depending upon their proximity to such poles, the shunts serve to divert the magnetic field created by the poles of the permanent magnets from passing through the retarding disk 5. Thus the binding screws 50 and 51 afford a convenient means for positively clamping the magnet shunts in any desired position and the cylindrical supports 46 and 47 afford a ready means for permitting angular adjustment of the shunts in order that they may occupy proper positions relatively to the poles of the magnets 6 and 7. Screws 52 and 53 of nonmagnetic material extend through the magnet shunts in such a manner that their ends rest upon the magnets 6 and 7 to serve as gages to determine the position of the shunts. Lock nuts 54 and 55 are provided to secure the gage screws 52 and 53 in any desired adjustment. Thus a ready means is provided for returning the magnet shunts to a previous adjustment if, for any reason, it is necessary to remove them from the bracket 8 and 9, as for example, when it is desired to remove the armature from the meter. The lower bearing plate 3 has threaded therethrough a bushing 56, which extends upward a sufficient distance to encircle the lower end of the armature shaft 2, the bore through the bushing being sufficiently large to clear the shaft and permit free rotation of the same. The bushing 56 has slidably fitted therein a plug 57 in the upper end of which a jewel is secured to constitute the lower bearing of the shaft. The plug 57 is normally held in an operative position by a spring 59, pivotally secured by the screw 60 to the bearing support 3 and in its operative position rotation of the spring 59 upon such screw is prevented by the engagement of a pin 61 with an opening 62 formed in the spring, such pin 61 being rigidly supported by the lower bearing support 3.

While I have shown in detail in the present application the bearing construction used at the lower end of the armature shaft and the construction of the brackets employed to support the permanent magnets, these constructions are not claimed in the present application, as they form the subject-matter of my co-pending applications Nos. 538,028 and 538,033 respectively, both filed on January 14, 1910.

While I have shown my improved magnet shunt construction in the particular embodiment herein described, I do not, however, limit myself to this exact construction but desire to claim any equivalent that may suggest itself to those skilled in the art.

What I claim is:

1. In an electric meter, the combination of an armature, a shaft for supporting such armature, a retarding disk mounted upon such shaft, a permanent magnet disposed with its sides substantially parallel with such retarding disk upon either side thereof, a slotted magnetic plate spanning the disk and adjustably supported in a plane substantially parallel with the ends of the magnet, and clamping means for securing such plate at any desired distance from the ends of the magnet.

2. In an electric meter, the combination of an armature, a shaft for supporting such armature, a retarding disk mounted upon such shaft, a permanent magnet disposed with its sides substantially parallel with such retarding disk upon either side thereof, a slotted magnetic shunt spanning the disk and adjustably supported substantially parallel with the ends of the magnet, clamping means for securing such magnetic shunt at any desired distance from the ends of the magnet, and a stop for determining the distance of the magnetic shunt from the ends of the magnet.

3. In an electric meter, the combination of an armature, a shaft for supporting such armature, a retarding disk mounted upon such shaft, a permanent magnet disposed with its sides substantially parallel with such retarding disk and upon either side thereof, a slotted magnetic shunt spanning the disk and adjustably supported substantially parallel with the ends of the magnet, clamping means for securing such magnetic shunt at any desired distance from the ends of the magnet, and a stop carried by such magnetic shunt for maintaining a practically constant air gap for removal and replacement of such shunt.

4. In an electric meter, the combination of an armature, a shaft for supporting such armature, a retarding disk mounted upon such shaft, a permanent magnet disposed with its sides substantially parallel with such retarding disk and upon either side thereof, a slotted magnetic shunt spanning the disk and adjustably supported substantially parallel with the ends of the magnet, clamping means for securing such magnetic shunt at any desired distance from the ends of the magnet, and a stop carried by such magnetic shunt for maintaining a practically constant air gap for removal and replacement of such shunt, such stop adjustable to secure any air gap desired.

In witness whereof, I hereunto subscribe my name this 28th day of December, A. D. 1909.

GUSTAVE A. SCHEEFFER.

Witnesses:
    ALBERT L. RABB,
    JOHN E. SCOTT.